United States Patent
Satou et al.

(10) Patent No.: US 9,183,999 B2
(45) Date of Patent: Nov. 10, 2015

(54) VEHICLE PUSH BUTTON SWITCH

(71) Applicants: KABUSHIKI KAISHA HONDA LOCK, Miyazaki-Shi, Miyazaki (JP); HONDA MOTOR CO., LTD., Minato-Ku, Tokyo (JP)

(72) Inventors: Yuuichi Satou, Miyazaki (JP); Tomoki Yamaguchi, Wako (JP)

(73) Assignees: Kabushiki Kaisha Honda Lock, Miyazaki (JP); Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 13/970,890

(22) Filed: Aug. 20, 2013

(65) Prior Publication Data

US 2014/0061014 A1    Mar. 6, 2014

(30) Foreign Application Priority Data

Aug. 30, 2012 (JP) .................. 2012-190224

(51) Int. Cl.
| | |
|---|---|
| *H01H 9/04* | (2006.01) |
| *H01H 13/06* | (2006.01) |
| *B60Q 1/00* | (2006.01) |
| *B60Q 1/30* | (2006.01) |
| *E05B 77/34* | (2014.01) |
| *E05B 81/76* | (2014.01) |
| *E05B 1/00* | (2006.01) |
| *E05B 83/18* | (2014.01) |

(52) U.S. Cl.
CPC ............... *H01H 9/04* (2013.01); *B60Q 1/0017* (2013.01); *B60Q 1/302* (2013.01); *E05B 1/0038* (2013.01); *E05B 77/34* (2013.01); *E05B 81/76* (2013.01); *H01H 13/06* (2013.01); *E05B 83/18* (2013.01)

(58) Field of Classification Search
CPC ............................... H01H 13/06; H01H 13/16
USPC ......................................... 200/302.2
See application file for complete search history.

(56) References Cited

U.S. PATENT DOCUMENTS

| | | | |
|---|---|---|---|
| 6,998,554 B2 | 2/2006 | Shimoda et al. | |
| 2010/0072050 A1* | 3/2010 | Kubota | ............... 200/341 |
| 2013/0107504 A1 | 5/2013 | Opolka | |

FOREIGN PATENT DOCUMENTS

| | | |
|---|---|---|
| CN | 1637981 A | 7/2005 |
| JP | 64-220 U | 1/1989 |

(Continued)

OTHER PUBLICATIONS

Official Communication dated May 7, 2015 issued in the corresponding CN Patent Application No. 201310380539X.

*Primary Examiner* — Edwin A. Leon
*Assistant Examiner* — Iman Malakooti
(74) *Attorney, Agent, or Firm* — Carrier Blackman & Associates, P.C.; Joseph P. Carrier; William D. Blackman (57) ABSTRACT

In a vehicle push button switch, a case fixed to a vehicle body or a lid is provided with a guide portion for guiding a push button and supports a switch used to change a switching state in response to a push operation of the push button. The switch is protected by using a sealing structure. The case includes: a first case member; a second case member fixed to the first case member; and an elastic member interposed between the first and second case members. The push button is connected to the center portion of the elastic member, and the switch housed in a housing chamber formed between the first case member and the elastic member is supported by the first case member such that the switching state is changed in response to bending of the elastic member which occurs with the push operation of the push button.

10 Claims, 10 Drawing Sheets

(56) References Cited

FOREIGN PATENT DOCUMENTS

| | | |
|---|---|---|
| JP | 64-29730 U | 2/1989 |
| JP | 2000-113764 A | 4/2000 |
| JP | 2003-197061 A | 7/2003 |
| JP | 2006-092984 A | 4/2006 |
| JP | 2010-135245 A | 6/2010 |
| WO | 2012/010126 A2 | 1/2012 |

* cited by examiner

VEHICLE PUSH BUTTON SWITCH

BACKGROUND OF THE INVENTION

1. Field of the Invention

The present invention relates to a vehicle push button switch in which a case fixed to a vehicle body or a lid openably and closably attached to the vehicle body is provided with a guide portion for guiding a linear movement of a push button operable by being pushed from outside of a vehicle and supports a switch used to change a switching state in response to a push operation of the push button.

2. Description of the Related Art

Japanese Patent Application Laid-open No. 2003-197061 has made known a push button switch in which a guide portion for guiding a push button is provided in a case supporting a switch used to change a switching state in response to a push operation of the push button.

SUMMARY OF THE INVENTION

Since the push button switch disclosed in Japanese Patent Application Laid-open No. 2003-197061 is disposed in a meter housing in a vehicle cabin, no sealing structure for protecting electronic parts such as the switch or the like is required. However, when an environment which an outer end of the push button switch faces is an environment exposed to rain water and the like or a high-humidity environment, a sealing structure for protecting the electronic parts such as the switch or the like is required. The sealing structure is desirably formed such that an increase in the number of parts and complication of the structure are avoided.

The present invention has been made in view of the circumstances described above and an object thereof is to provide a vehicle push button switch capable of protecting a switch by using a sealing structure capable of avoiding an increase in the number of parts and complication of the structure.

In order to achieve the object, according to a first aspect of the present invention, there is provided a vehicle push button switch in which a case fixed to a vehicle body or a lid openably and closably attached to the vehicle body is provided with a guide portion for guiding a linear movement of a push button operable by being pushed from outside of a vehicle and supports a switch used to change a switching state in response to a push operation of the push button, wherein the case includes: a first case member fixed to the vehicle body or the lid; a second case member fixed to the first case member and having the guide portion and an opening portion surrounded by the guide portion; and an elastic member having an entire peripheral edge portion interposed between the first and second case members in such a way that a center portion of the elastic member faces the opening portion, the push button is connected to the center portion of the elastic member, and the switch is housed in a housing chamber formed between the first case member and the elastic member and is supported by the first case member such that the switching state is changed in response to bending of the center portion of the elastic member which occurs with the push operation of the push button.

According to the first aspect of the present invention, the case supporting the switch includes: the first case member; the second case member having the guide portion and fixed to the first case member; and the elastic member having the entire peripheral edge portion interposed between the first and second case members and the center portion of the elastic member is bent to come into contact with the switch in the push operation of the push button. Accordingly, a sealing structure for protecting the switch can be obtained in a simple structure capable of avoiding an increase in the number of parts.

According to a second aspect of the present invention, in addition to the first aspect, a restricting surface configured to restrict expansion of the elastic member by coming in contact with the elastic member is formed in an inner surface of the second case member, in a peripheral edge of the opening portion.

According to the second aspect of the present invention, the restricting surface formed in the inner surface of the second case member comes in contact with the elastic member and thereby restricts the expansion of the elastic member. Accordingly, the expansion of the elastic member is suppressed even when the elastic member thermally expands due to temperature rise and the like. It is thus possible to suppress variation in an operation stroke of the push button and improve operability.

According to a third aspect of the present invention, in addition to the first or second aspect, a push operation portion is provided in the push button at an outer end of a bar-shaped portion to be operable by being pushed from the outside of the vehicle, the bar-shaped portion extending linearly to be guided by the guide portion, a plurality of the guide portions are disposed away from each other in a peripheral direction of the bar-shaped portion to guide a plurality of sections of the bar-shaped portion that are located in the peripheral direction, and a plurality of guide ribs extending in a longitudinal direction of the bar-shaped portion to come in sliding contact with inner surfaces of the plurality of guide portions protrude from an outer surface of the bar-shaped portion.

According to the third aspect of the present invention, the plurality of guide ribs protruding from the outer surface of the bar-shaped portion of the push button and extending in the longitudinal direction of the bar-shaped portion come in sliding contact with the plurality of guide portions disposed away from each other in the peripheral direction of the bar-shaped portion. Accordingly, a work of inserting the push button between the plurality of guide portions is facilitated and an installation work of the push button is facilitated.

According to a fourth aspect of the present invention, in addition to the third aspect, the guide ribs are formed to extend from an end portion on the push operation portion side to an intermediate portion of the bar-shaped portion in the longitudinal direction thereof.

According to the fourth aspect of the present invention, the guide ribs are formed to extend from the end portion on the push operation portion side to the intermediate portion of the bar-shape portion in the longitudinal direction thereof. Accordingly, the guide ribs do not come into sliding contact with the guide portions at the start of insertion of the push button between the guide portions and the insertion of the push button between the guide portions is thereby facilitated.

According to a fifth aspect of the present invention, in addition to the third aspect, an erroneous installation preventing rib protrudes from one portion of the bar-shaped portion in the peripheral direction thereof and the positions of the plurality of guide portions relative to the bar-shaped portion are set in such a way that the erroneous installation preventing rib is positioned at a fixed position relative to the plurality of guide portions.

According to the fifth aspect of the present invention, the erroneous installation preventing rib positioned at the fixed position relative to the plurality of guide portions protrudes from one portion of the bar-shaped portion in the peripheral direction. Accordingly, the erroneous installation of the push button can be surely prevented.

According to a sixth aspect of the present invention, in addition to the third aspect, a step portion corresponding to distal ends of the guide portions is formed between the bar-shaped portion and the push operation portion of the push button to come in contact with the distal ends of the guide portions in a deep push operation of the push button.

According to the sixth aspect of the present invention, the step portion formed between the bar-shaped portion and the push operation portion of the push button comes into contact with the distal end of the guide portions in the deep push operation of the push button. Accordingly, the deep push of the push button can be restricted while the number of parts is reduced and the structure is simplified by providing no dedicated restricting portion.

According to a seventh aspect of the present invention, in addition to the sixth aspect, thin sections are formed in distal end portions of the guide portions which are formed integrally with the second case member made of a synthetic resin, the thin sections being thinner than other sections of the guide portions.

According to the seventh aspect of the present invention, the thin sections are formed in the distal end portions of the guide portions formed integrally with the second case member made of the synthetic resin. Accordingly, when the step portion of the push button comes into contact with the distal ends of the guide portions, the distal end portions of the guide portions can be bent to reduce a load applied to the push button.

The above and other objects, characteristics and advantages of the present invention will be clear from detailed descriptions of the preferred embodiment which will be provided below while referring to the attached drawings.

DESCRIPTION OF THE PREFERRED EMBODIMENT

A description is given below of an embodiment of the present invention with reference to the attached drawings of FIGS. 1 to 10. First, in FIGS. 1 and 2, a trunk lid 11 is openably and closably attached to a rear portion of a vehicle body B of a passenger vehicle V, a rear spoiler 12 is attached to an upper surface of a rear portion of the trunk lid 11, and a push button switch 13 for transmitting an unlatching signal for releasing a latched state of the trunk lid 11 is disposed in the rear spoiler 12. Specifically, in a case where the push button switch 13 is pushed in the latched state of the closed trunk lid 11, two-way communication is performed between the vehicle and a portable device carried by a vehicle driver and the latched state of the trunk lid 11 is released when the portable device is confirmed to be a regular portable device through code matching.

Figure 1:
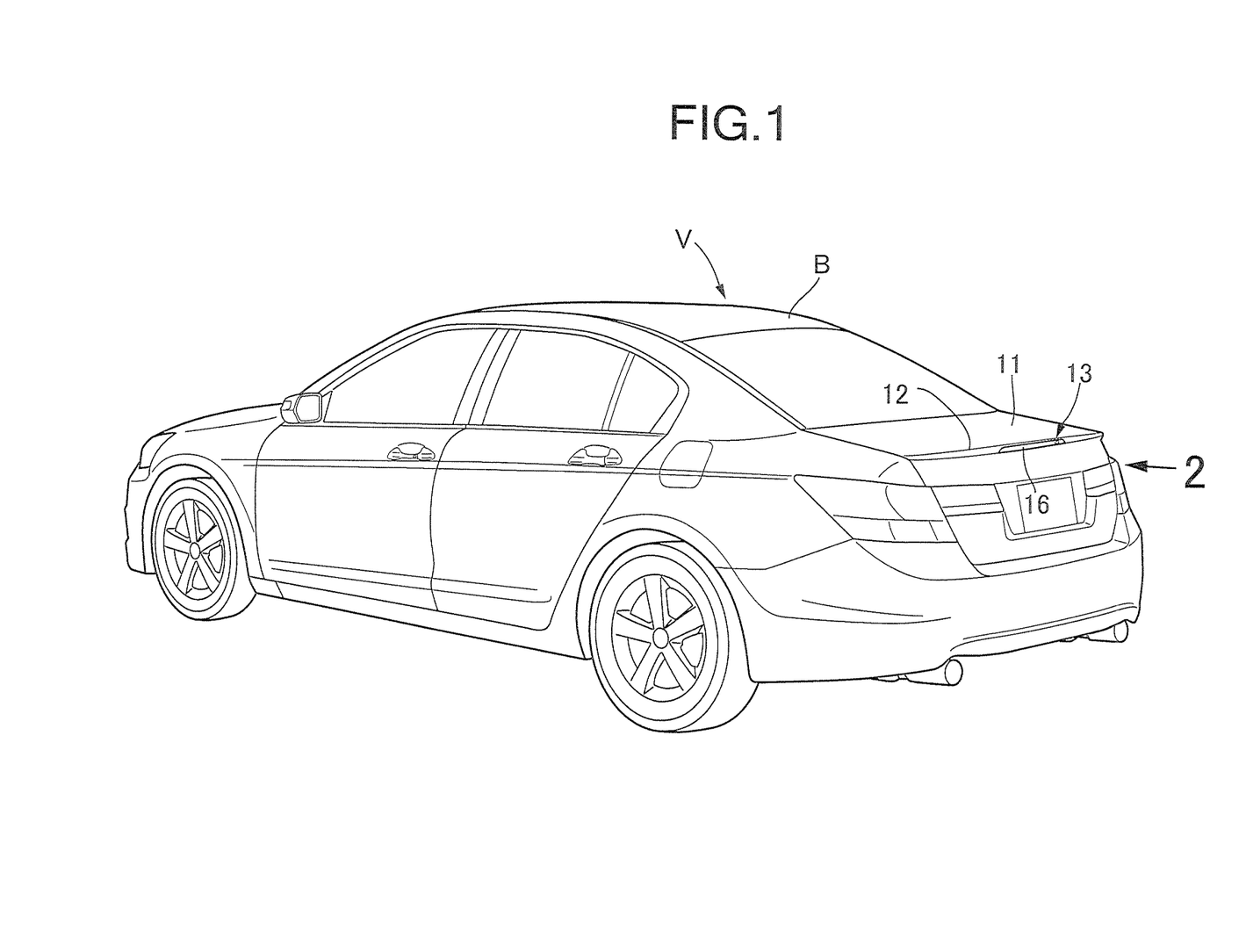
FIG. 1 is a perspective view of a passenger vehicle as viewed from a rear side.
Figure 2:
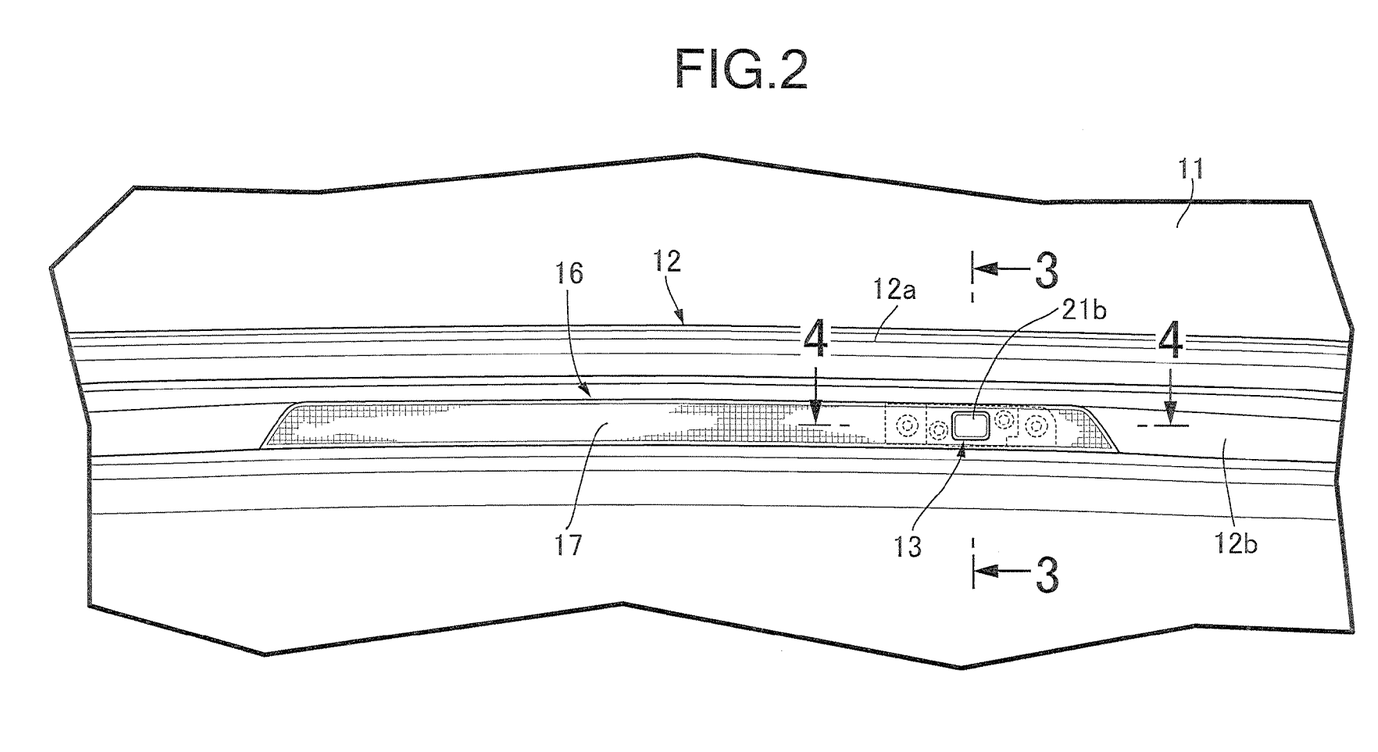
FIG. 2 is a view in the direction of the arrow 2 in FIG. 1.
Figure 3:
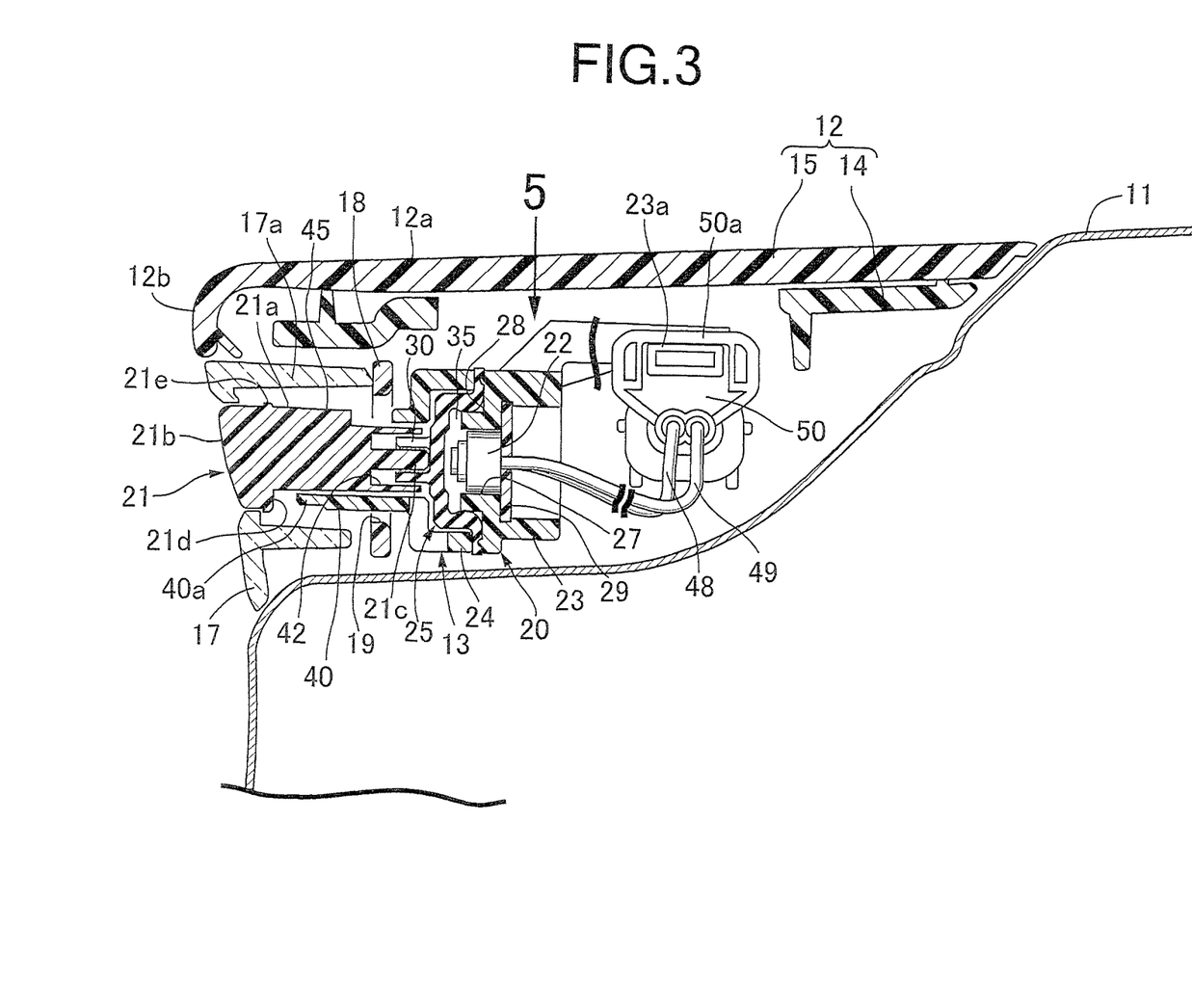
FIG. 3 is a sectional view taken along the line 3-3 in FIG. 2.

Referring also to FIG. 3, the rear spoiler 12 is formed by joining an inner spoiler 14 made of a synthetic resin with high stiffness and an outer spoiler 15 made of a painted synthetic resin to each other in such a way that the inner spoiler 14 is covered with the outer spoiler 15. A horizontal cross-sectional shape of the rear spoiler 12 includes a horizontal portion 12a substantially horizontal in the closed state of the trunk lid 11 and a vertical portion 12b extending downward from a rear end of the horizontal portion 12a.

A brake lamp 16 is disposed in a center portion of the vertical portion 12b of the rear spoiler 12 in a vehicle width direction. A lens 17 forming part of the brake lamp 16 is made of a translucent synthetic resin and is supported by an attachment member 18 fixed to the inner spoiler 14 of the rear spoiler 12.

The push button switch 13 is disposed in a right portion of the brake lamp 16 in the vehicle width direction, a tube portion 17a having a rectangular horizontal cross section and extending in a front-rear direction with a rear end coming in contact with the attachment member 18 is integrally formed in the lens 17 of the brake lamp 16, and a rectangular through hole 19 corresponding to the rear end of the tube portion 17a is provided in the attachment member 18.

The push button switch 13 includes a case 20 fixed to the trunk lid 11, a push button 21 operable by being pushed from the outside of the vehicle, and a tact switch 22 supported by the case 20 such that a switching state is changed in response to a push operation of the push button 21. The push button 21 is housed inside the tube portion 17a of the lens to be capable of linearly moving in a longitudinal direction of the tube portion 17a.

Figure 4:
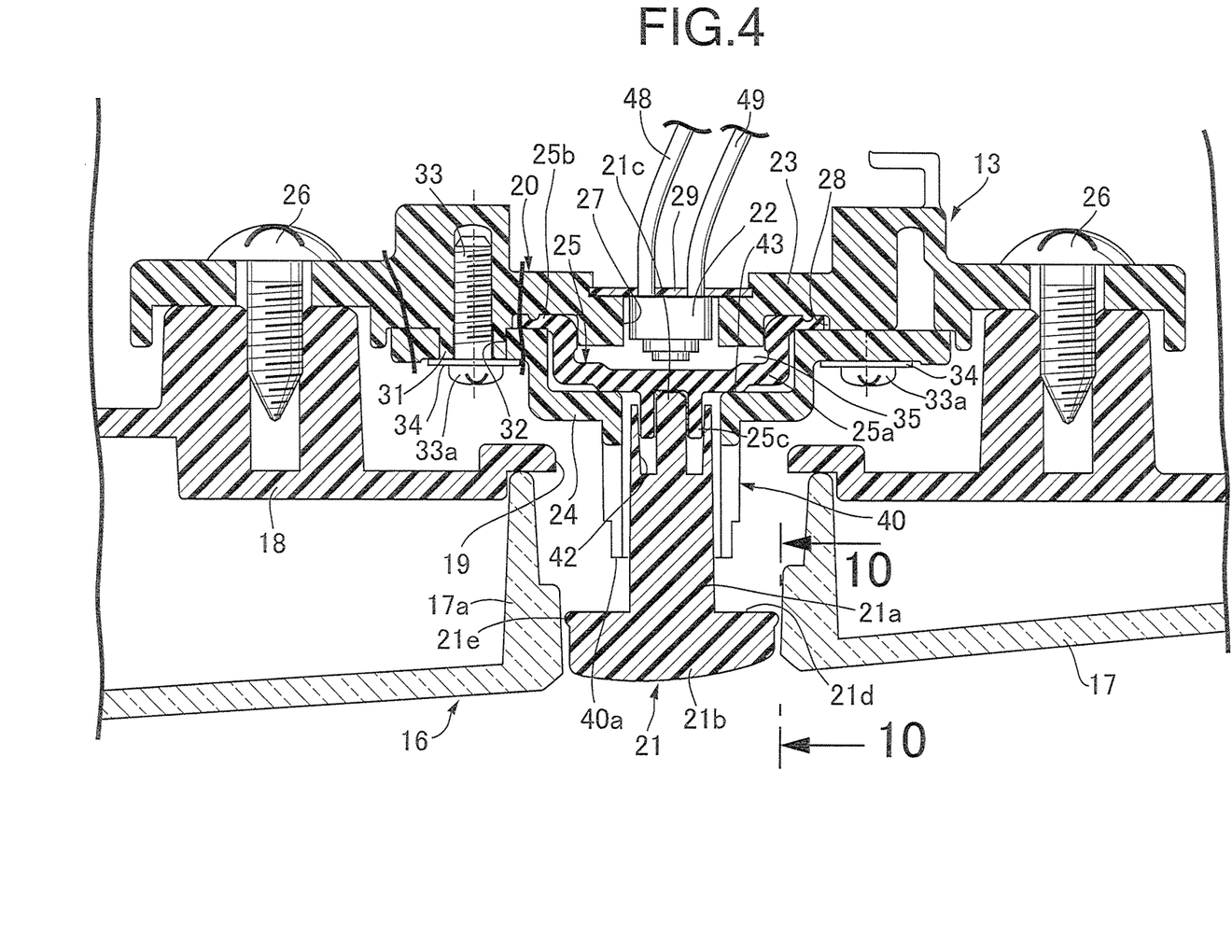
FIG. 4 is a sectional view taken along the line 4-4 in FIG. 2.
Figure 5:
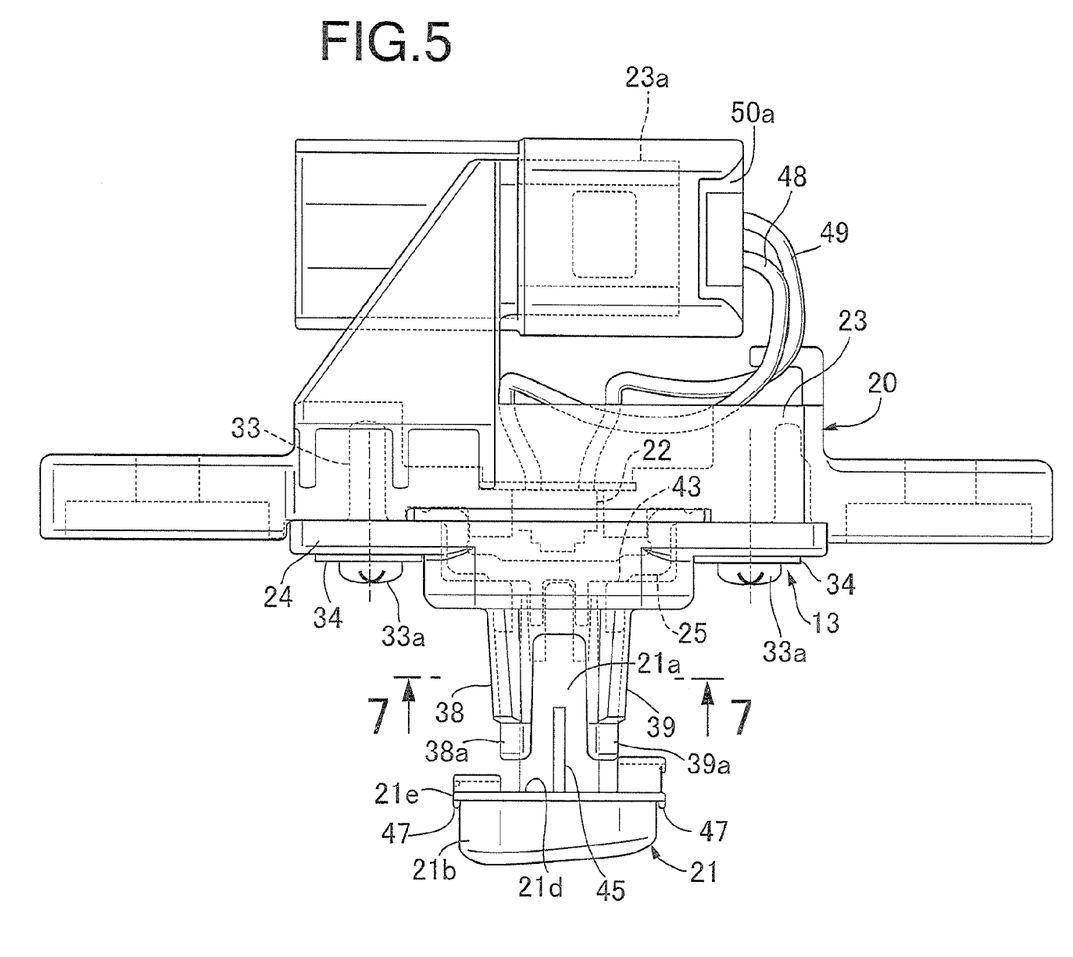
FIG. 5 is a view of a push button switch as viewed in the direction of the arrow 5 in FIG. 3.
Figure 6:
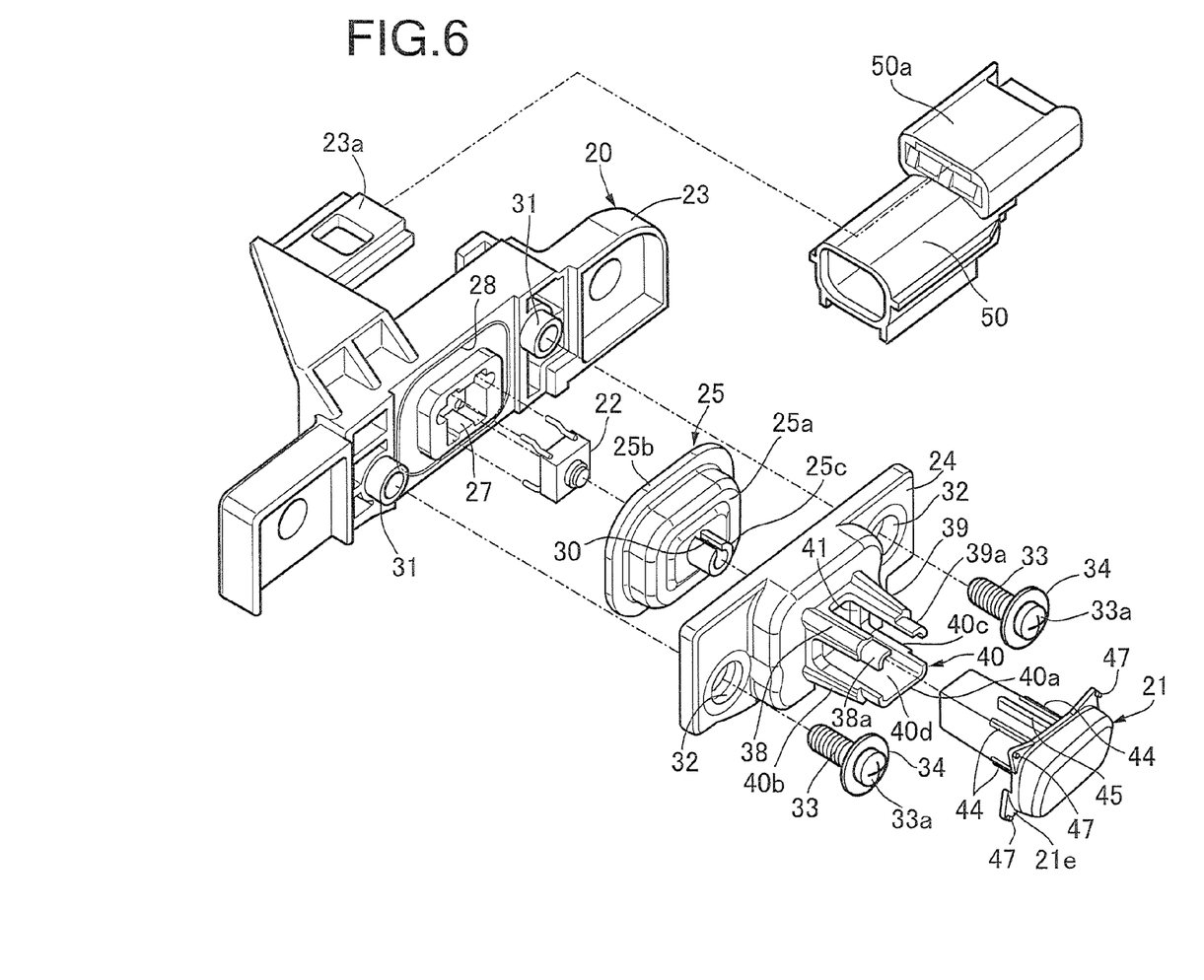
FIG. 6 is an exploded perspective view of the push button switch.

Referring also to FIGS. 4 to 6, the case 20 is formed of: a first case member 23 fixed to the trunk lid 11 and made of a synthetic resin; a second case member 24 fixed to the first case member 23 and made of a synthetic resin; and an elastic member 25 having an entire peripheral edge portion interposed between the first and second case members 23, 24.

The first case member 23 is fixed to the attachment member 18 by, for example, a pair of screw members 26. A switch housing hole 27 is provided in the first case member 23 to correspond to the tube portion 17a of the lens 17. A recessed portion 28 surrounding the switch housing hole 27 and being continuous in an endless shape is provided in a rear surface of the first case member 23.

The tact switch 22 is housed in the switch housing hole 27 and is supported by a substrate 29 which is attached to a front surface of the first case member 23 to close a front end of the switch housing hole 27.

The elastic member 25 is made of, for example, rubber and integrally includes: a plate-shaped elastic member main portion 25a covering the tact switch 22 from the rear side; a flange portion 25b protruding laterally from an open end edge of the elastic member main portion 25a to fit into the recessed portion 28; and a connecting tube portion 25c protruding rearward from a center portion of the elastic member main portion 25a. A slit 30 extending in the longitudinal direction is formed in one portion in the connecting tube portion 25c in the peripheral direction.

A pair of cylindrical boss portions 31 protruding rearward are provided to protrude from a rear surface of the first case member 23, outside the recessed portion 28. Fitting holes 32 to which the boss portions 31 are fitted are provided in the second case member 24. Enlarged diameter head portions 33a of screw members 33 inserted into the boss portions 31 and screwed to the first case member 23 come in contact and engage with a rear surface of the second case member 24 via washers 34 and the second case member 24 is thereby fixed to the first case member 23. In the fixed state, an entire outer peripheral edge portion of the elastic member 25, i.e. the entire flange portion 25b is interposed between the first and second case members 23, 24 and the tact switch 22 is housed in a housing chamber 35 formed between the first case member 23 and the elastic member 25.

In the push button 21, a push operation portion 21b protruding outward from a linearly-extending bar-shaped portion 21a is provided at an outer end of the bar-shaped portion 21a in such a way as to be operable by being pushed from the outside of the vehicle. The bar-shaped portion 21a is formed such that an outer shape of a horizontal cross section thereof is rectangular.

The second case member 24 includes: multiple, for example three, guide portions of first to third guide portions 38, 39, 40 which are disposed away from each other in the peripheral direction of the bar-shaped portion 21a to guide multiple sections of the bar-shaped portion 21a in the push button 21 that are located in the peripheral direction; and an opening portion 41 surrounded by the first to third guide portions 38 to 40. The center portion of the elastic member 25 interposed between the first and second case members 23, 24, i.e. the center portion of the elastic member main portion 25a is disposed to face the opening portion 41 together with the connecting tube portion 25c.

In an inner end of the bar-shaped portion 21a in the push button 21, an insertion recessed section 42 to which the connecting tube portion 25c of the elastic member 25 is inserted is provided and a connecting shaft portion 21c protruding toward the elastic member 25 from a closed end center portion of the insertion recessed section 42 is integrally provided. Inserting the connecting shaft portion 21c into the connecting tube portion 25c with adhesive provided therebetween causes the push button 21 to be connected to the elastic member 25, and the tact switch 22 housed in the housing chamber 35 can thereby cause the switching state to change in response to bending of the center portion of the elastic member 25 which occurs with the push operation of the push button 21.

Moreover, a restricting surface 43 restricting expansion of the elastic member 25 by coming in contact with the elastic member 25 is formed in the inner surface of the second case member 24, in the peripheral edge of the opening portion 41, and displacement of the elastic member 25 away from the tact switch 22 is restricted by the restricting surface 43, the elastic member 25 exerting an elastic force biasing the push button 21 in a direction to return the push button 21 to its original position.

Figure 7:
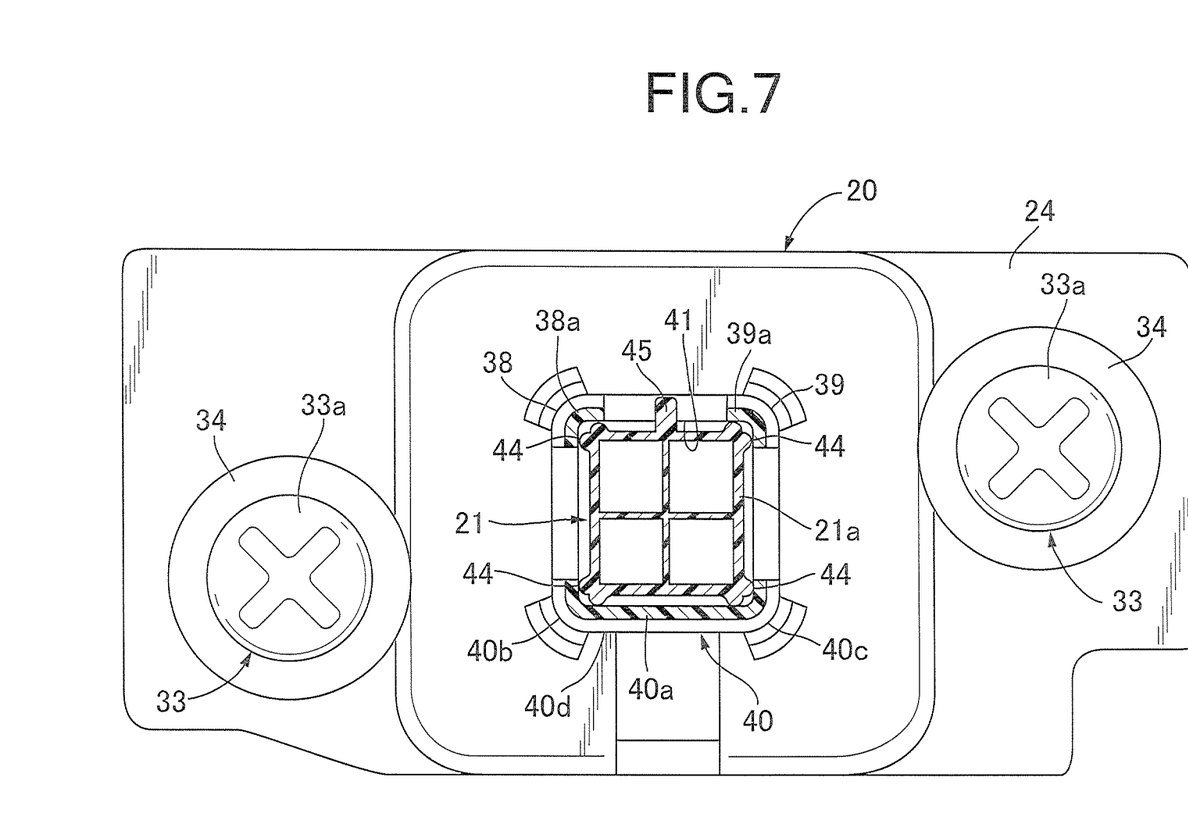
FIG. 7 is a sectional view taken along the line 7-7 in FIG. 5.

Referring also to FIG. 7, the first and second guide portions 38, 39 among the first to third guide portions 38 to 40 correspond respectively to two upper corners of the bar-shaped portion 21a whose outer shape of the horizontal cross section is rectangular. The first and second guide portions 38, 39 are each formed to have a substantially L-shaped horizontal cross section and to extend in the longitudinal direction of the bar-shaped portion 21a. Moreover, the third guide portion 40 which is remaining one of the guide portions is formed of: two corner guide sections 40b, 40c corresponding respectively to two lower corners of the bar-shaped portion 21a and each having a substantially L-shaped horizontal cross section; and a flat-plate shaped connecting wall section 40d connecting the corner guide sections 40b, 40c to each other.

Moreover, multiple guide ribs 44 extending in the longitudinal direction of the bar-shaped portion 21a to come in sliding contact with inner surfaces of the multiple guide portions protrude from outer surfaces of the bar-shaped portion 21a in the push button 21. In the embodiment, the guide ribs 44 coming in sliding contact with the inner surfaces of the first guide portion 38, the second guide portion 39, and the two corner guide sections 40b, 40c of the third guide portion 40 protrude from four corners of the outer surfaces of the bar-shaped portion 21a whose outer shape of the horizontal cross section is rectangular.

Furthermore, the guide ribs 44 are each formed to extend from an end portion on the push operation portion 21b side to an intermediate portion of the bar-shaped portion 21a in the longitudinal direction thereof.

An erroneous installation preventing rib 45 protrudes from one portion of the bar-shaped portion 21a in the peripheral direction thereof and the positions of the first to third guide portions 38 to 40 relative to the bar-shaped portion 21a are set in such a way that the erroneous installation preventing rib 45 is positioned at a fixed position relative to the first to third guide portions 38 to 40. Specifically, the outer shape of the horizontal cross section of the bar-shaped portion 21a is rectangular, the first to third guide portions 38 to 40 are disposed to guide the guide ribs 44 at the four corners of the bar-shaped portion 21a, and the third guide portion 40 is formed to have the connecting wall section 40d facing one of the outer surfaces of the bar-shaped portion 21a which is on the opposite side to a portion where the erroneous installation preventing rib 45 protrudes.

Figure 8:
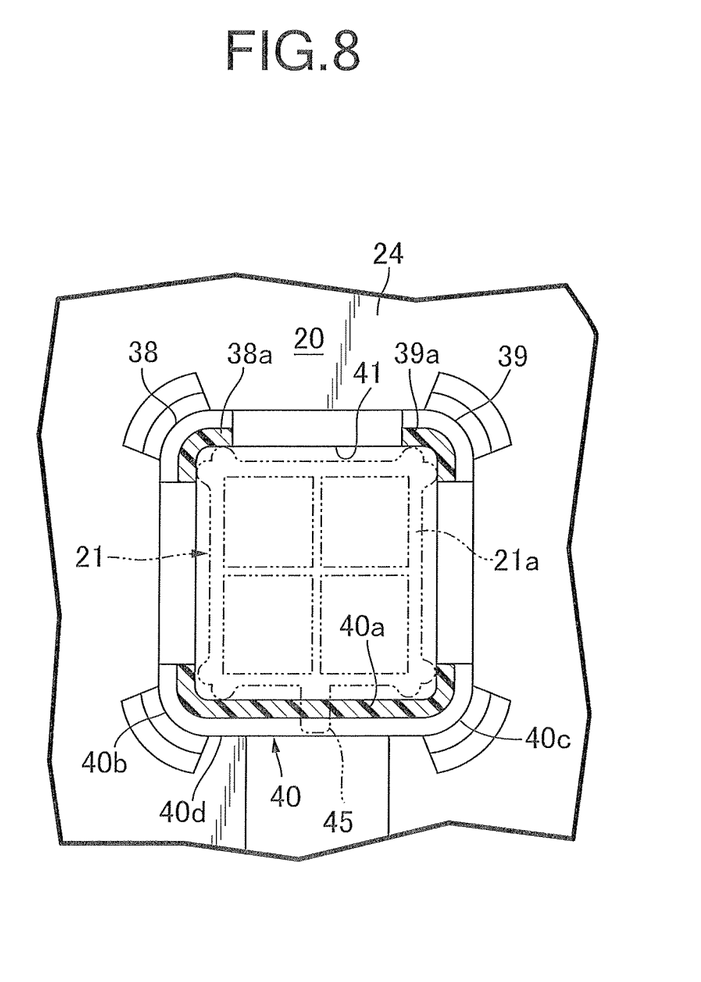
FIG. 8 is a sectional view corresponding to FIG. 7 and showing a state where the position of the push button relative to guide portions is turned 180° from the state of FIG. 7.
Figure 9:
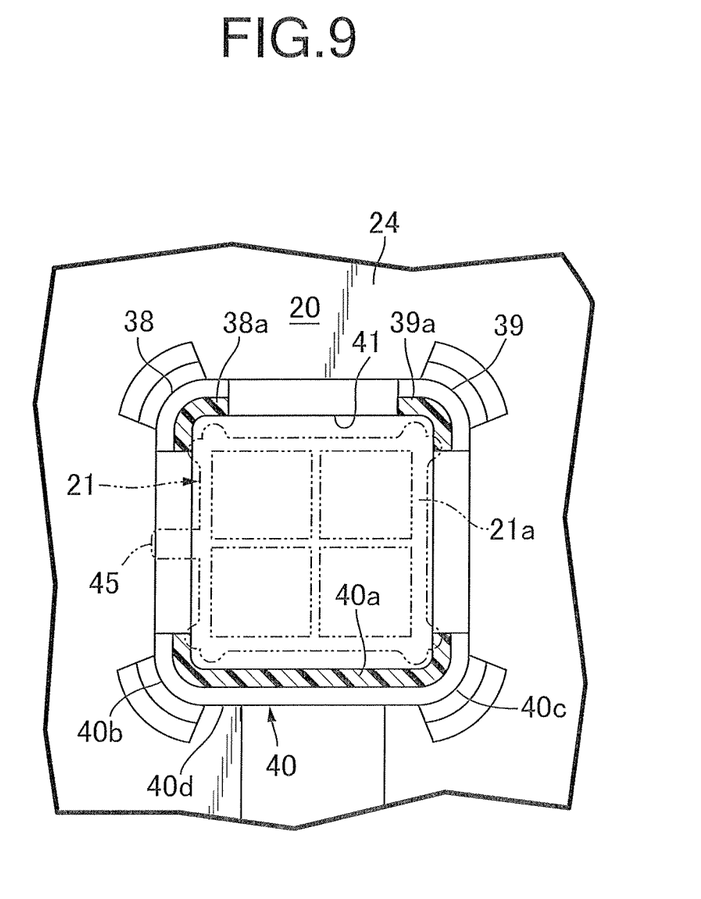
FIG. 9 is a sectional view corresponding to FIG. 7 and showing a state where the position of the push button relative to the guide portions is turned 90° from the state of FIG. 7.

Accordingly, as shown in FIG. 7, the push button 21 can be installed by being pushed and inserted between the first to third guide portions 38 to 40 with the erroneous installation preventing rib 45 disposed between the first and second guide portions 38, 39. However, as shown in FIG. 8, when the position of the push button 21 relative to the first to third guide portions 38 to 40 is turned 180° from the state shown in FIG. 7, the erroneous installation preventing rib 45 comes in contact with the connecting wall section 40d of the third guide portion 40 and thus the push button 21 cannot be installed by being pushed and inserted between the first to third guide portions 38 to 40. Moreover, as shown in FIG. 9, when the position of the push button 21 relative to the first to third guide portions 38 to 40 is turned 90° from the state shown in FIG. 7, the erroneous installation preventing rib 45 is located between the first and third guide portions 38, 40 or between the second and third guide portions 39, 40. In this case, since the guide ribs 44 coming in sliding contact with the inner surfaces of the first guide portion 38, the second guide portion 39, and the two corner guide sections 40b, 40c of the third guide portion 40 protrude from the four corners of the outer surfaces of the bar-shaped portion 21a whose outer shape of the horizontal cross section is rectangular, the push button 21 cannot be installed by being pushed and inserted between the first to third guide portions 38 to 40.

A step portion 21d corresponding to distal ends of the first to third guide portions 38 to 40 is formed between the bar-shaped portion 21a and the push operation portion 21b of the push button 21 to come in contact with the distal ends of the first to third guide portions 38 to 40 in a deep push operation of the push button 21. Moreover, in distal end portions of the first to third guide portions 38 to 40 formed integrally with the second case member 24 made of the synthetic resin, there are formed thin sections 38a, 39a, 40a thinner than other sections of the guide portions 38 to 40.

Figure 10:
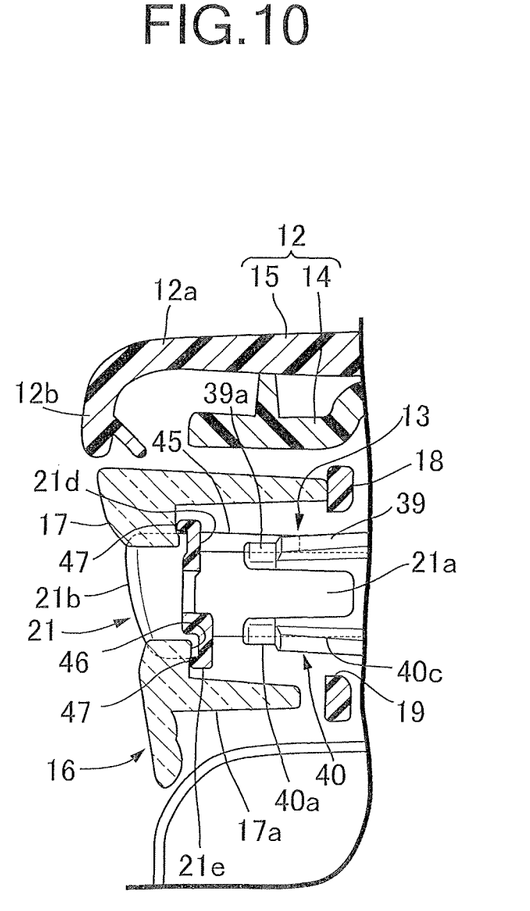
FIG. 10 is a sectional view taken along the line 10-10 of FIG. 4.

Referring also to FIG. 10, a flange portion 21e facing a restricting step section 46 from the front side is integrally formed to protrude outward from an outer peripheral edge of the push operation portion 21b in the push button 21, the restricting step section 46 facing forward and provided in the tube portion 17a formed integrally with the lens 17 of the brake lamp 16. Protrusions 47 coming in point contact with the restricting step section 46 protrude from multiple positions of the flange portion 21e which are spaced away from each other in the peripheral direction of the flange portion 21e.

The protrusions 47 are provided to avoid full-surface contact of the flange portion 21e with the restricting step section 46 in a non-operation state of the push button 21 and there is obtained an effect of preventing a case where water entering a space between the flange portion 21e and the restricting step section 46 freezes and the push operation of the push button 21 becomes difficult due to the full-surface contact.

Referring again to FIGS. 3 to 6, a pair of lead wires 48, 49 connected to the tact switch 22 supported by the case 20 are lead out from the substrate. A connector 50 to which the lead wires 48, 49 are connected is held by a plate-shaped connector holding portion 23a provided integrally with the first case member 23. Specifically, a tubular supported portion 50a is integrally formed in the connector 50 and the connector 50 is held by the connector holding portion 23a by inserting the connector holding portion 23a into the supported portion 50a.

Next, operations of the embodiment are described. The case 20 fixed to the trunk lid 11 is provided with the first to third guide portions 38 to 40 for guiding the linear movement of the push button 21 operable by being pushed from the outside of the vehicle and supports the tact switch 22 used to change the switching state in response to the push operation of the push button 21, the case 20 is formed of: the first case member 23 fixed to the trunk lid 11; the second case member 24 fixed to the first case member 23 and having the first to third guide portions 38 to 40 and the opening portion 41 surrounded by the first to third guide portions 38 to 40; and the elastic member 25 having the entire peripheral edge portion interposed between the first and second case members 23, 24 with the center portion of the elastic member 25 facing the opening portion 41, the push button 21 is connected to the center portion of the elastic member 25, and the tact switch 22 housed in the housing chamber 35 formed between the first case member 23 and the elastic member 25 is supported by the first case member 23 such that the switching state changes in response to bending of the center portion of the elastic member 25 which occurs with the push operation of the push button 21. Accordingly, a sealing structure protecting the tact switch 22 can be obtained in a simple structure capable of avoiding an increase in the number of parts.

Moreover, the restricting surface 43 restricting expansion of the elastic member 25 by coming in contact with the elastic member 25 is formed in the inner surface of the second case member 24, in the peripheral edge of the opening portion 41. Accordingly, the expansion of the elastic member 25 is suppressed even when the elastic member 25 thermally expands due to temperature rise and the like, and it is thus possible to suppress variation in an operation stroke of the push button 21 and improve operability.

Furthermore, in the push button 21, the push operation portion 21b is provided at the outer end of the bar-shaped portion 21a in such a way as to be operable by being pushed from the outside of the vehicle, the bar-shaped portion 21a linearly extending to be guided by the first to third guide portions 38 to 40, the first to third guide portions 38 to 40 are disposed away from each other in the peripheral direction of the bar-shaped portion 21a to guide multiple sections of the bar-shaped portion 21a that are located in the peripheral direction, and the multiple guide ribs 44 extending in the longitudinal direction of the bar-shaped portion 21a to come in sliding contact with the inner surfaces of the first to third guide portions 38 to 40 protrude from the outer surfaces of the bar-shaped portion 21a. Accordingly, a work of inserting the push button 21 between the first to third guide portions 38 to 40 is facilitated and an installation work of the push button 21 is thus facilitated.

Moreover, the guide ribs 44 are formed to extend from the end portion on the push operation portion 21b side to the intermediate portion of the bar-shaped portion 21a in the longitudinal direction thereof. Accordingly, the guide ribs 44 do not come into sliding contact with the first to third guide portions 38 to 40 at the start of insertion of the push button 21 between the first to third guide portions 38 to 40 and the insertion of the push button 21 between the first to third guide portions 38 to 40 is thereby facilitated.

Furthermore, the erroneous installation preventing rib 45 protrudes from one portion of the bar-shaped portion 21a in the peripheral direction thereof and the positions of the first to third guide portions 38 to 40 relative to the bar-shaped portion 21a are set in such a way that the erroneous installation preventing rib 45 is fixed at a fixed position relative to the first to third guide portions 38 to 40. Accordingly, the erroneous installation of the push button 21 can be surely prevented.

Moreover, the step portion 21d corresponding to the distal ends of the first to third guide portions 38 to 40 is formed between the bar-shaped portion 21a and the push operation portion 21b of the push button 21 to come in contact with the distal ends of the first to third guide portions 38 to 40 in the deep push operation of the push button 21. Accordingly, the deep push of the push button 21 can be restricted while the number of parts is reduced and the structure is simplified by providing no dedicated restricting portion.

Furthermore, in the distal end portions of the first to third guide portions 38 to 40 formed integrally with the second case member 24 made of the synthetic resin, there are formed the thin sections 38a, 39a, 40a thinner than other sections of the guide portions 38 to 40. Accordingly, when the step portion 21d of the push button 21 comes into contact with the distal ends of the first to third guide portions 38 to 40, the distal end portions of the first to third guide portions 38 to 40 can be bent to reduce a load applied to the push button 21.

The embodiment of the present invention has been described above. However, the present invention is not limited to the aforementioned embodiment and various design changes can be made without departing from the invention described in the claims.

For example, in the aforementioned embodiment, a description is given of the case where the case 20 is supported by the trunk lid 11. However, the present invention can be applied to a configuration in which the case is supported by a lid other than the trunk lid 11 and to a configuration in which the case is supported by a vehicle body openably and closably supporting the lid.

What is claimed is:

1. A vehicle push button switch in which a case fixed to a vehicle body or a lid openably and closably attached to the vehicle body is provided with a guide portion for guiding a linear movement of a push button operable by being pushed from outside of a vehicle and supports a switch used to change a switching state in response to a push operation of the push button, wherein the case includes: a first case member fixed to the vehicle body or the lid; a second case member fixed to the first case member and having the guide portion and an opening portion surrounded by the guide portion; and an elastic member having an entire outer peripheral flange portion interposed between the first and second case members in such a way that a center portion of the elastic member faces the opening portion, the push button is connected to the center portion of the elastic member such that an elastic force of the elastic member urges the push button in a return direction, the switch is housed in a housing chamber formed between the first case member and the elastic member and is supported by the first case member such that the switching state is changed in response to bending of the center portion of the elastic member which occurs with the push operation of the push button, and a restricting surface restricting expansion of the elastic member by coming in contact with the elastic member is formed in the inner surface of the second case member, in the peripheral edge of the opening portion, and displacement of the elastic member away from the switch is restricted by the restricting surface, the elastic member having an elastic member main portion which is formed closer to the center portion than the flange portion and covering the switch from a rear side, the elastic member main portion being placed, at a portion thereof remote from the flange portion, in abutment against the restricting surface.

2. The vehicle push button switch according to claim 1, wherein the restricting surface is formed in the inner surface of the second case member, in the peripheral edge of the opening portion, so as to face toward the switch.

3. The vehicle push button switch according to claim 1 or 2, wherein a push operation portion is provided in the push button at an outer end of a bar-shaped portion to be operable by being pushed from the outside of the vehicle, the bar-shaped portion extending linearly to be guided by the guide portion, a plurality of the guide portions are disposed away from each other in a peripheral direction of the bar-shaped portion to guide a plurality of sections of the bar-shaped portion that are located in the peripheral direction, and a plurality of guide ribs extending in a longitudinal direction of the bar-shaped portion to come in sliding contact with inner surfaces of the plurality of guide portions protrude from an outer surface of the bar-shaped portion.

4. The vehicle push button switch according to claim 3, wherein the guide ribs are formed to extend from an end portion on the push operation portion side to an intermediate portion of the bar-shaped portion in the longitudinal direction thereof.

5. The vehicle push button switch according to claim 3, wherein an erroneous installation preventing rib protrudes from one portion of the bar-shaped portion in the peripheral direction thereof and the positions of the plurality of guide portions relative to the bar-shaped portion are set in such a way that the erroneous installation preventing rib is positioned at a fixed position relative to the plurality of guide portions.

6. The vehicle push button switch according to claim 3, wherein a step portion corresponding to distal ends of the guide portions is formed between the bar-shaped portion and the push operation portion of the push button to come in contact with the distal ends of the guide portions in a deep push operation of the push button.

7. The vehicle push button switch according to claim 6, wherein thin sections are formed in distal end portions of the guide portions which are formed integrally with the second case member made of a synthetic resin, the thin sections being thinner than other sections of the guide portions.

8. The vehicle push button switch according to claim 2, wherein a push operation portion is provided in the push button at an outer end of a bar-shaped portion to be operable by being pushed from the outside of the vehicle, the bar-shaped portion extending linearly to be guided by the guide portion, a plurality of the guide portions are disposed away from each other in a peripheral direction of the bar-shaped portion to guide a plurality of sections of the bar-shaped portion that are located in the peripheral direction, and a plurality of guide ribs extending in a longitudinal direction of the bar-shaped portion to come in sliding contact with inner surfaces of the plurality of guide portions protrude from an outer surface of the bar-shaped portion.

9. The vehicle push button switch according to claim 1, wherein the first case member is directly fixed to the vehicle body or lid with a fastener, and the second case member is directly fixed to the first case member with another fastener.

10. The vehicle push button switch according to claim 1, wherein the elastic member is disposed entirely between the first and second case member.

* * * * *